United States Patent [19]

Davidovits

[11] Patent Number: 4,472,199

[45] Date of Patent: Sep. 18, 1984

[54] SYNTHETIC MINERAL POLYMER COMPOUND OF THE SILICOALUMINATES FAMILY AND PREPARATION PROCESS

[76] Inventor: Joseph Davidovits, 16 rue Galilée, Saint-Quentin 02100, France

[21] Appl. No.: 377,204

[22] PCT Filed: Sep. 2, 1981

[86] PCT No.: PCT/FR81/00112

§ 371 Date: Apr. 29, 1982

§ 102(e) Date: Apr. 29, 1982

[87] PCT Pub. No.: WO82/00816

PCT Pub. Date: Mar. 18, 1982

[30] Foreign Application Priority Data

Sep. 3, 1980 [FR] France ................. 80 18971

[51] Int. Cl.³ .................. C04B 7/00; C01B 33/26
[52] U.S. Cl. .................. 106/85; 106/84; 106/286.2; 106/286.5; 264/319; 264/333; 423/328; 423/329; 501/153
[58] Field of Search .......... 423/118, 327–330; 264/299, 313, 333; 106/288 B, 85, 86, 286.2, 286.5; 252/455 Z; 501/1, 80, 153; 502/60

[56] References Cited

U.S. PATENT DOCUMENTS 2,972,516  2/1961  Barrer et al. ............ 423/328
3,012,853  12/1961  Milton .................. 252/455 Z
3,056,654  10/1962  Barrer et al. ............ 423/329
4,349,386  9/1982  Davidovits .............. 106/85

OTHER PUBLICATIONS

"IUPAC International Symposium on MacroMolecules", Stockholm 1976, Topic III.
"PACTECIV", Society of Plastic Engineers, U.S.A. preprint pp. 151-154.
Chemical Abstract 86:19049v, Synthetic Kaliophilite, Zhukova, R. S.; Begletsov, V. V., (USSR), Khim Tekrol, (Kiev), 1976, (3), 63-4.
Barrer, R. M. "Some Researches on Silicates: Mineral Syntheses and Metamorphoses", Transactions of the British Ceramic Soc., vol. 56, No. 4, pp. 155-173, 1957.

Primary Examiner—Edward J. Meros
Assistant Examiner—Jackson Leeds
Attorney, Agent, or Firm—Kendrick, Netter & Bennett

[57] ABSTRACT

A mineral polymer of the silicoaluminate family has a composition expressed in terms of oxides as follows:

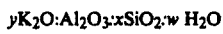

$$yK_2O:Al_2O_3:xSiO_2\cdot w\,H_2O$$

where, in the fully hydrated form, "w" is a value at the most equal to 4, "x" is a value in the range of about 4.0 to about 4.2, and "y" is a value in the range of about 1.3 to about 1.52. These mineral polymers are solid solutions which comprise one phase of a potassium polysilicate having the formula:

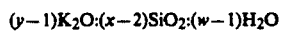

$$(y-1)K_2O:(x-2)SiO_2:(w-1)H_2O$$

and one phase of a potassium polysialate polymer having the following formula:

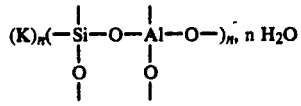

where "n" is the degree of condensation of the polymer.

6 Claims, No Drawings

SYNTHETIC MINERAL POLYMER COMPOUND OF THE SILICOALUMINATES FAMILY AND PREPARATION PROCESS

This invention relates to a mineral polycondensation process for making cast or molded products at temperatures generally up to about 120° C. This process is related to processes for making zeolites or molecular sieves.

The products of such processes, however, have characteristic three-dimensional frameworks which are successions of tetrahedrons TO$_4$, where T is silicon, aluminum, gallium, phosphorous or the like. Those products form channels or voids of regular dimensions. The voids are molecular in size. Accordingly, the mineral frameworks can be used to separate organic molecules of different molecular sizes. Those structures also exhibit ion exchange properties. Moreover, those products catalyze several different organic polymerization systems.

Numerous patents and other references describe methods for making those synthetic minerals, zeolitics and molecular sieves. D. W. Breck's book entitled, "Zeolite Molecular Sieves," published by Interscience in 1974, is a good reference. Generally, those methods are hydrothermal syntheses of silico-aluminate gels in strong, highly concentrated aqueous alkali. The reactant mixture, containing a large excess of water, is sealed in a container at constant pressure and temperature. Preferably, the pressure is atmospheric, and the temperature is in the range of about 25 C. to about 125° C. The reaction continues over more than ten hours until crystallization of the products occurs. The chemical formula for the resulting synthetic zeolites and molecular sieves may be written as follows:

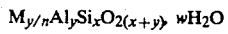

wherein M is a cation with a valence "n." Many crystalline products have been made in such hydrothermal syntheses. However, these products are very porous and have poor mechanical properties, even when agglomerated with a binder. I have discovered that when reaction conditions do not favor crystallization or crystal formation, I obtain novel products.

An object of this invention is to provide synthetic mineral products with such properties as hard surfaces (5-7 on the Mohs scale), thermal stability and high surface smoothness and precision. Such products are useful for tooling, and for molding art objects, ceramics and the like, and building materials.

The main object is to provide a novel mineral polymer, more precisely a novel mineral polymer compound, and to provide a method of making a new mineral polymer compound.

Other objects such as use of this mineral polymer compound as a binder are apparent from this specification and claims.

The names for these novel three-dimensional polymers are set forth in the following publications: "IUPAC International Symposium on Macromolecules," Stockholm, 1976, Topic III; and "PACTEC IV,", Society of Plastic Engineers, U.S.A., preprint page 151. These mineral polymers are called polysialates and have this empirical formula:

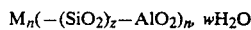

wherein "z" is 1, 2 or 3; M is a monovalent cation such as potassium or sodium, and "n" is the degree of polycondensation. Where "z" is 1, the mineral polymer has this formula:

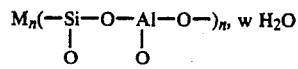

and is called polysialate or PS for short.

Our new polymer is of the K—PS polymer compound type where "M" is potassium.

A suitable method for distinguishing our new polymers from known polymers is through their X-ray powder diffraction pattern. K—PS polymer compound has the characteristic x-ray powder diffraction pattern given in Table A below. To obtain this data, we used the Debye-Scherrer method. The radiation used was the K-Alpha doublet of copper.

The X-ray pattern of K—PS is related to that of natural kaliophilite (KAlSiO$_4$), which corresponds to the general formula of polysialate. This natural mineral is not a zeolite, but an anhydrous feldspathoid with the formula:

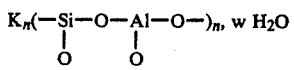

where "w" is a value in the range of 0 to 1.

This distinction is very important. Mineral polymers containing zeolitic water must be dehydroxylated at a temperature up to about 400° C. if they are to be used without damage at higher temperature. On the contrary, mineral polymers of the kaliophilite type will resist thermal shock. Thermal shock resistance is a fast test for distinguishing a zeolitic framework from a feldspathoidic one.

Mineral polymer polysialates K—PS have this chemical formula:

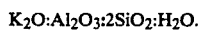

The method of making K—PS comprises preparing a reactant mixture in which the oxide-mole ratios are higher than stoichiometric values. For example, the ratio SiO$_2$/Al$_2$O$_3$ is in the range of 3.3 to 4.5, instead of 2. These conditions differ from those used in a process of making synthetic (Na, K) Poly(Sialate-Siloxo) or (Na, K)—PSS mineral polymers which are described in French patent application No. 79.22041, and have this empirical formula:

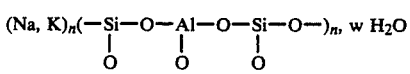

In French application No. 79.22041 and corresponding U.S. patent application Ser. No. 182,571, filed Aug. 29, 1980, now U.S. Pat. No. 4,349,386 the oxide-mole ratios used for making (Na, K)—PSS fall in the range of:

| | |
|---|---|
| (Na$_2$O, K$_2$O)/SiO$_2$ | 0.20 to 0.28 |
| SiO$_2$/Al$_2$O$_3$ | 3.5 to 4.5 |
| H$_2$O/(Na$_2$O, K$_2$O) | 15 to 17.5 |

-continued

| (Na$_2$O, K$_2$O)/Al$_2$O$_3$ | 0.8 to 1.20 |
|---|---|

TABLE A

| Zeolite Z | Zeolite G | Zeolite W | Kaliophilite | (K)-PS |
|---|---|---|---|---|
| KAlSiO$_4$,3H$_2$O | KAlSi$_2$O$_6$,5H$_2$O | K$_5$Al$_5$Si$_9$O$_{28}$,25H$_2$O | KAlSiO$_4$ | (K)$_n$(—Si—O—Al—O—)$_n$ <br>          \|    \| <br>          O   O |
| d(A) I | d(A) I | d(A) I | d(A) I | d(A) I |
| — | 9.47 mS | 9.99 20 | 10 halo | 10-14 11.5 halo |
| — | — | 8.17 49 | — | — |
| 7.45 VVS | — | 7.09 54 | — | — |
| — | 6.90 m | — | — | — |
| — | 5.22 m | 5.34 28 | — | — |
| 4.78 vw | — | 5.01 56 | — | — |
| — | — | 4.45 21 | 4.49 35 | 4.49 m |
| — | 4.32 S | 4.28 35 | 4.28 40 | 4.27 w |
| — | 3.97 mS | — | — | — |
| — | 3.70 w | 3.64 20 | — | — |
| 3.47 m | 3.46 S | — | 3.52 35 | 3.52 m |
| 3.29 m | — | 3.25 100 | 3.32 35 | 3.33 S |
| 3.09 VS | 3.11 mw | 3.17 75 | broad band | 3.23 halo |
| 2.97 S | 2.93 VVS | 2.95 71 | 3.10 100 | to |
| 2.82 VS | 2.80 w | 2.72 53 | broad band | 2.79 |
| — | 2.59 S | 2.54 26 | 2.61 45 | 2.56 w |
| 2.35 s | 2.29 S | 2.40 8 | 2.24 20 | 2.25 vw |
| 2.20 w | 2.19 mS | 2.18 10 | 2.13 37 | 2.17 vw |

However, if the reactant mixture is exclusively composed of a potassium polysilicate, potassium hydroxide (KOH) and alumino-silicate oxide (Si$_2$O$_5$, Al$_2$O$_2$)$_n$, then the mineral polymer produced is not (Na, K)—PSS. The X-ray powder diffraction pattern and the thermogravimetric analysis are different. The X-ray patterns of (Na, K)—PSS are related to those of natural analcime, gismondine, gmelinite and phillipsite, whereas the polymer obtained here is amorphous. Thermogravimetric analysis of this polymer gave a loss of water amounting to 5% by weight up to 325° C., the weight remaining constant for higher temperature. By contrast, thermogravimetric analysis of (Na, K)—PSS gave a loss of water in the range of 21% to 29% by weight between 100° C. and 500° C. This polymer does not exhibit zeolitic properties. It is brittle, but hard: 5 on the Mohs scale.

A synthetic kaliophilite KAlSiO$_4$.0.1H$_2$O has been prepared by H. Besson, S. Caillere and S. Henin (Comptes Rendue Academie des Sciences de Paris, Vol. 272, Series D, pp. 2749-2752 (1971)), using silico-aluminate gels and potassium carbonate (K$_2$CO$_3$). The X-ray pattern of this anhydrous synthetic kaliophilite is given in Table A. Its pattern is related to that of K—PS, but shows a strong line at 3.10 Angstroms, accompanying the broad line at 2.79 to 3.23 Angstroms. Table A also gives X-ray patterns of synthetic zeolites related to the polymer K—PS, such as zeolite Z (or zeolite KF), zeolite G (or zeolite K—G), and zeolite W (or zeolite K—M, K—H). These patterns are given in D. W. Breck's book cited above.

Table B shows the oxide-mole ratios of the reactant mixture used for the synthetic zeolites from Table A.

TABLE B

| | Zeolite Z | Zeolite G | Zeolite W | Kaliophilite | K-PS |
|---|---|---|---|---|---|
| K$_2$O/SiO$_2$ | 0.425 | 0.50 | 0.6 | Excess | 0.26 to 0.36 |
| SiO$_2$/Al$_2$O$_3$ | 4 | 5 | 6 | 2 to 4 | 4 to 4.2 |
| H$_2$O/Al$_2$O$_3$ | Excess | Excess | 75 | Excess | 12.5 to 23 |
| K$_2$O/Al$_2$O$_3$ | 1.7 | 2.5 | 3 | Excess | 1.12 to 1.6 |

The method for making K—PS polymeric compound comprises preparing a potassium silico-aluminate/water mixture where the composition of the reactant mixture, in terms of oxide-mole ratios, falls within the ranges shown in Table C below.

TABLE C

| Oxide-Mole Ratios of the Reactant Mixture | |
|---|---|
| K$_2$O/SiO$_2$ | 0.25 to 0.48 |
| SiO$_2$/Al$_2$O$_3$ | 3.3 to 4.5 |
| H$_2$O/Al$_2$O$_3$ | 10 to 25 |
| K$_2$O/Al$_2$O$_3$ | 0.9 to 1.6 |

The usual method for preparing this mixture comprises dissolving in water an alumino-silicate oxide, KOH, and a potassium polysilicate. The alumino-silicate oxide (Si$_2$O$_5$, Al$_2$O$_2$)$_n$ may be prepared from a polyhydroxy-alumino-silicate having the formula (Si$_2$O$_5$, Al$_2$(OH)$_4$)$_n$, where the aluminum cation is in the octahedral state and is in six-fold coordination. The polyhydroxy-alumino-silicate is calcined and dehydroxylated at, say, between 550° C. and 800° C. The resulting alumino-silicate oxide has the aluminum cation in four-fold coordination and in a tetrahedral position.

Various polyhydroxy-alumino-silicates may be used as the starting material for the preparation of aluminosilicate oxide, including minerals having basal spacings of about seven Angstroms and having at least one aluminum cation located in the octahedral layers. Examples are alushite, carnat, china clay, lithomarge, neokaolin, parakaolinite, pholenite, endellite, glossecolite, halloysite, milanite, berthierine, fraignotite, grovenite, amesite and chamoisite.

The silico-aluminate mineral polymer compound obtained by polycondensation of a reactant mixture as given in Table C, will have a composition expressed in terms of oxides as follows:

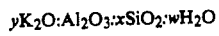

$$yK_2O:Al_2O_3:xSiO_2\cdot wH_2O$$

where, in the fully hydrated form, "w" is a value at the most equal to 4, "x" is a value in the range of about 3.3 to about 4.5, and "y" is a value in the range of about 0.9 to 1.6.

The mineral polymer compound is a solid solution which comprises 35 to 90 parts by weight of a potassium polysilicate $(y-1)K_2O:(x-2)SiO_2:(w-1)H_2O$ and 10 to 65 parts by weight of the mineral polymer K—PS, which has the formula:

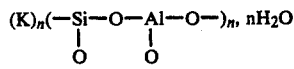

and an X-ray pattern related to that of the natural mineral kaliophilite as shown in Table A.

The quantities of the reactants, namely potassium polysilicate, alumino-silicate oxide and potassium hydroxide, fall in the ranges shown in Table C. Preferably, the ratio $(K_2O)/Al_2O_3$ is in the range of about 1.3 to 1.52, and the ratio $SiO_2/Al_2O_3$ is in the range of about 4.0 to 4.2. Higher ratios induce a free potassium silicate phase in the solidified polymer compound, and cause potassium silicate migration which can disturb the physical and mechanical properties of the resulting mineral products. If the ratio of potassium oxide to aluminum trioxide is lower than 1.1, and the ratio of silicon dioxide to aluminum trioxide is lower than 3.7, the solidified polymer compound will have numerous cracks, and cannot be used in the fabrication of molded objects.

By contrast, the oxide-mole ratios of reactant mixtures for synthetic crystalline zeolites Z, G and W are always much higher than the values for the K—PS polymer compound, as Table B shows. In particular, water is employed in large excess, and the $K_2O$ quantities are much higher.

In the reactant mixture, according to Table C, the quantity of water present equals the sum of solvent water plus the bound water in the reactants. The reactant mixture is viscous, but is not a gel. Rather, the mixture becomes a mineral resin with unique rheological properties after reacting for at least about one hour at ambient temperature, say 25° C.

After aging, the mineral resin may be used alone, or may be mixed with organic or inorganic additives or fillers. The resin may be used as a binder or a mineral cement for organic or mineral particles or fibers. The resin is cast, poured, squeezed or vibrated into a mold and heated to a temperature up to about 120° C., but preferably to a temperature in the range of about 60° C. to about 95° C. When polycondensation is complete, the solids are separated from the mold and dried at a temperature up to about 100° C.

Polycondensation and heating times are a function of the temperature and the heating process used. At an ambient temperature, such as 25° C., polycondensation requires more than 15 hours. At 50° C., polycondensation requires about four hours; at 85° C., about 1.5 hours; and at 95° C., about 0.5 hours. These times may differ, and are often shorter when other heating techniques are used. Such other techniques include high frequency, microwave, Joule effect or electrical wires within the reactant mixture itself. Because the reactant mixtures are polyelectrolytes, these heating techniques effect rapid polycondensation and drying.

The pot life of the mineral resin can be as long as two to four hours at ambient temperature depending on the sequence of mixing the reactants. Longer pot life is attained if the potassium hydroxide is not mixed directly with the reactive alumino-silicate oxide solution. In fact, if the alkali is added directly to the alumino-silicate oxide solution, the resulting product differs from the polymers of this invention.

The method of preparing our new mineral polymer compound comprises masking either the alumino-silicate oxide or the potassium hydroxide. Masking of the potassium hydroxide can be effected by mixing the alkali in water with polysilicate, and then adding this solution to the alumino-silicate oxide. Preferably, we mix the alumino-silicate oxide with aqueous polysilicate, to the exclusion of alkali, and add this solution to a strong aqueous potassium hydroxide solution. These two reactant mixtures are stable and retain their reactivity even after long storage periods. Moreover, these mixtures are easy to handle and store.

Polycondensation is best effected in a closed mold under hydrothermal conditions and in the presence of water. Evaporation of water from the mixture during polycondensation is undesirable. To prevent water evaporation at the surface of a reactant mixture placed in an open mold, the surface can be covered with a thin plastic film or thin layer of a hydrophobic liquid. After heating the mixture in the mold, the polycondensed solid is separated from the mold and dried. The molded object has good physical and mechanical properties, including a surface hardness in the range of 5 to 7 Mohs, depending on the nature of the mineral fillers added to the resin. The precision of the molded product's surface compares favorably with the quality obtained with such organic resins as epoxies and polyurethanes.

The following examples illustrate the methods of making the new K—PS polymer compound and some of its properties.

EXAMPLE 1

We prepared 860 grams of a reactant mixture containing 11.33 moles water, 1.630 moles potassium oxide, 4.46 moles of silicon dioxide and 1.081 moles of aluminum trioxide. The source of aluminum trioxide is the alumino-silicate oxide prepared by dehydroxylating a natural polyhydroxy-alumino-silicate $(Si_2O_5, Al_2(OH)_4)_n$. The source of silicon dioxide is this alumino-silicate oxide and a potassium silicate. The source of potassium oxide is this potassium silicate and potassium hydroxide. The oxide-mole ratios in the reactant mixture are shown in Table D.

TABLE D

| | |
|---|---|
| $K_2O/SiO_2$ | 0.36 |
| $SiO_2/Al_2O_3$ | 4.12 |
| $H_2O/Al_2O_3$ | 16.03 |
| $K_2O/Al_2O_3$ | 1.51 |

The reactant mixture, which had the viscosity of a resin, was aged for a period of one hour at ambient temperature (25° C.), then placed under vacuum to eliminate air and gas bubbles. The outgassed resin was poured into a mold.

The surface of the resin in contact with the atmosphere was covered with a thin polyethylene film to prevent water evaporation during curing, which was effected at 85° C. in an oven over a period of 1.5 hours.

The hardened mineral product was separated from the mold and dried at 85° C.

The density of the product was 1.7 grams per milliliter, and its hardness was 4.5 on the Mohs scale. The product was white and low in porosity. Physico-chemical analysis of the mineral product gave this molar composition:

$1.5K_2O:Al_2O_3:4.1SiO_2:3H_2O$ which corresponds to the formula of a polymer compound. This polymer compound contains, in a solid solution, one phase of a potassium polysilicate which corresponds to the formula:

$0.5K_2O:2.1SiO_2:2H_2O$ and one K—PS which corresponds to the formula:

$$(K)_n(-\underset{O}{\underset{|}{Si}}-O-\underset{O}{\underset{|}{Al}}-O-)_n \cdot nH_2O$$

The X-ray powder diffraction pattern is essentially that shown for K—PS in Table A. To obtain this data, we used the Debye-Scherrer method, K-Alpha of doublet copper, in a 57.3 mm chamber.

The product obtained had many cracks in it. If at least one mineral filler is added to the reactant mixture after, during or even before aging, these cracks disappear. The mechanical and physical properties of the molded objects obtained following this process are excellent. Tensile strength is about 180 kg/cm$^2$, hardness may reach 7 on the Mohs scale, and linear dilatation coefficient, as a function of temperature, is in the range of 2 to $5 \times 10^{-6}$ m/m/°C.

EXAMPLE 2

Following the steps described in Example 1, we prepared 960 grams of a reactant mixture containing 22.88 moles of water, the other components being unchanged. The oxide-mole ratios of the reactant mixture are set forth in Table D, except H$_2$O/Al$_2$O$_3$ which was 21.

The fluid reactant mixture was aged for one hour at ambient temperature. Then we added 640 grams of synthetic cordierite (with mullite), with a size range lower than 120 microns. The viscous mixture was poured into a mold and hardened at 85° C. The product had a density of 2.3 grams per milliliter and a surface hardness of 5 on the Mohs scale. Its external dimensions indicated that polycondensation took place without any shrinkage.

X-ray diffraction was determined by a different technique, plotting the theta/2 curve under cobalt emission at 1.79 Angstroms. The pattern showed the very strong lines of cordierite and the middle strong lines of mullite, weak lines at 4.49/4.28/3.53/2.59/2.28/2.16 Angstroms and a broad line between 3.38 and 2.80 Angstroms, which is covered with the strong lines of cordierite. This X-ray diffraction pattern is identical to that of K—PS shown in Table A.

EXAMPLE 3

Following the steps described in Example 1, we prepared 792 grams of a reactant mixture containing 13.5 moles of water, the other components being unchanged. The oxide-mole ratios of the reactant mixture are set forth in Table D, except H$_2$O/Al$_2$O$_3$ which was 12.5.

The fluid reactant mixture was aged for one hour at ambient temperature. Then we added 540 grams of synthetic cordierite (with mullite), with a size range lower than 120 microns, and we followed the steps described in Example 2.

We determined the X-ray diffraction pattern by the same technique as in Example 2 and obtained the same lines for K—PS, plus weak lines at 3.24/2.95/2.88/2.82 Angstroms. These are in the broad amorphous band for K—PS, namely between 2.79 and 3.23, cited in Table A.

The ratios H$_2$O/Al$_2$O$_3$ may vary from 10 to 25. Preferably, the ratio is in the range of 14 to 20. Higher ratios increase the porosity of the solidified product. Lower ratios induce a free alkalinity and cause migrations which can disturb the potassium silicate phase in the solid solution of the polymer compound. Preferably, the oxide-mole ratios of the reactant mixture fall within the range in Table E below.

TABLE E

| | |
|---|---|
| K$_2$O/SiO$_2$ | 0.30 to 0.38 |
| SiO$_2$/Al$_2$O$_3$ | 4.0 to 4.20 |
| H$_2$O/Al$_2$O$_3$ | 14 to 20 |
| K$_2$O/Al$_2$O$_3$ | 1.3 to 1.52 |

EXAMPLE 4

Following the steps described in Example 1, we prepared 860 grams of a reactant mixture and added 220 grams of muscovite with a size range lower than 120 microns and 90 grams of calcium fluoride (CaF$_2$) in fine powder form. We obtained a viscous resin which we mixed with 1,150 grams of zircon sand. The resulting zircon sand/resin mixture was cast and vibrated in a mold, then heated at 85° C. for a period of 1.5 hours. The dried product had a density of 3.0 grams per milliliter. It was shiny and had a surface hardness of 6 on the Mohs scale.

Interpretation of the X-ray diffraction pattern is not easy. The strong lines of zircon and calcium fluoride and the numerous lines of muscovite cover practically all the lines of K—PS.

EXAMPLE 5

Following the steps described in Example 1, we prepared a reactant mixture. After aging, the resin was painted on a mold which was the negative of a sculpture. During the same period, we mixed five kilograms of flint with a size range from 0.5 to 5 mm, with 0.5 kilograms, or 10% by weight of the resin. This mixture was cast and vibrated in the painted mold. The mold was covered with a polyethylene film and cured at ambient temperature (25° C.). Next day, we obtained a sculpture which was separated from the mold and had a very fine, hard and shiny surface.

We have used the potassium silico-aluminate reactant mixtures described above in order to make molded objects obtained by the agglomeration of 5 to 95 parts by weight of mineral and/or organic fillers, with 5 to 95 parts by weight of a binder which is a mineral polymer compound. This mineral polymer compound has a formula with a molar composition as follows:

$$yK_2O:Al_2O_3:xSiO_2:wH_2O$$

where, in the fully hydrated form, "w" is a value at the most equal to 4, "x" is a value in the range of about 3.3 to about 4.5, and "y" is a value in the range of about 0.9 to about 1.6.

This mineral polymer compound is a solid solution which comprises 35 to 90 parts by weight of a potassium polysilicate with the formula:

$$(y-1)K_2O:(x-2)SiO_2:(w-1)H_2O$$

and 10 to 65 parts by weight of a potassium polysialate with the formula:

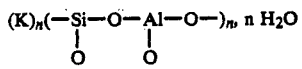

and having an X-ray powder diffraction pattern related to the natural mineral kaliophilite, as shown in Table A for K—PS.

Molded objects with high thermal shock resistance were obtained by addition of fillers such as muscovite, synthetic or natural alumino-silicate, zircon, chamotte and other ceramics or refractory products.

The molded objects resist the direct action of a flame and may be used at temperatures in the range of 300° C. to 1,200° C. Preferably, they are first dried and dehydrated at a temperature below 350° C. Dehydration and dehydroxylation of the mineral polymer compound transforms the molded object into a product having excellent thermal stability properties equivalent to or better than ceramic materials. Its composition expressed in terms of oxides is as follows:

$$yK_2O{:}Al_2O_3{:}xSiO_2$$

where "x" has a value in the range of about 3.3 to about 4.5, and "y" has a value in the range of about 0.9 to about 1.6. These polymer compounds are solid solutions comprising one phase of a potassium polysilicate with the formula:

$$(y-1)K_2O{:}K_2O{:}(x-2)SiO_2$$

and one phase of a K—PS polysialate with the formula:

The potassium silico-aluminate reactant mixture described above becomes a mineral resin which can be mixed with at least one mineral and/or organic filler, and used as a binder or cement. These mixtures may also include such additives and fillers as dyestuffs, pigments, reinforcement fibers and water-repelling agents. Polycondensation and setting occur in the range of room temperature up to 120° C.

Molded objects of this invention have many uses, depending on the physical, mechanical or chemical properties required. They can be used in industries such as the building industry and may also be used as decoration, taking the form of objects, molds, tools, blocks and panels.

These molded objects may support several physicochemical, physical or mechanical post-treatments, as well as finishing or coating operations. If necessary, the molded objects can be heated to a temperature of at least 325° C. One obtains ceramic-like products having excellent thermal and dimensional stability.

I claim:

1. A mineral polymer formed at a temperature of up to about 120° C. and having a composition, expressed in terms of oxides, as follows:

$$yK_2O{:}Al_2O_3{:}xSiO_2{:}xH_2O$$

where, in the fully hydrated form, "w" is a value at the most equal to 4, "x" is a value in the range of about 4.0 to about 4.2, "y" is a value in the range of about 1.3 to about 1.52, and where the oxide-mole ratios of the reactant mixture from which said mineral polymer is made are as follows:

| | |
|---|---|
| $K_2O/SiO_2$ | 0.30 to 0.38 |
| $SiO_2/Al_2O_3$ | 4.0 to 4.2 |
| $H_2O/Al_2O_3$ | 14 to 20 |
| $K_2O/Al_2O_3$ | 1.3 to 1.52 | said mineral polymer comprising one phase of a potassium polysilicate having the following formula:

$$(y-1)K_2O{:}(x-2)SiO_2{:}(w-1)H_2O$$

and one phase of a potassium polysialate polymer having the following formula:

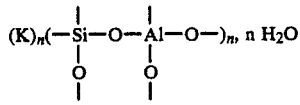

where "n" is the degree of polymerization of said potassium polysialate polymer, said mineral polymer having an x-ray diffraction pattern, determined by the Debye-Scherrer method using the K-alpha doublet of copper, substantially as follows:

d(A) I
10–11.5 halo
4.49 m
4.27 w
3.52 m
3.33 S
3.23 halo to
2.79
2.56 w
2.25 vw
2.17 vw.

2. The mineral polymer of claim 1 comprising 35 to 90 parts by weight of said potassium polysilicate and 10 to 65 parts by weight of said potassium polysialate polymer.

3. A method for preparing a mineral polymer formed at a temperature of up to about 120° C. and having a composition, expressed in terms of oxides, as follows:

$$yK_2O{:}Al_2O_3{:}xSiO_2{:}wH_2O$$

where, in the fully hydrated form, "w" is a value at the most equal to 4, "x" is a value in the range of about 4.0 to about 4.2, "y" is a value in the range of about 1.3 to about 1.52, and where the oxide-mole ratios of the reactant mixture from which said mineral polymer is made are as follows:

| | |
|---|---|
| $K_2O/SiO_2$ | 0.30 to 0.38 |
| $SiO_2/Al_2O_3$ | 4.0 to 4.2 |
| $H_2O/Al_2O_3$ | 14 to 20 |
| $K_2O/Al_2O_3$ | 1.3 to 1.52 | said mineral polymer comprising one phase of a potassium polysilicate having the following formula:

$(y-1)K_2O:(x-2)SiO_2:(w-1)H_2O$ and one phase of a potassium polysialate polymer having the following formula:

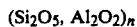

where "n" is the degree of polymerization of said potassium polysialate polymer which comprises reacting potassium silicate with potassium hydroxide and then reacting the resulting mixture with alumino-silicate oxide having the formula:

$(Si_2O_5, Al_2O_2)_n$ where the aluminum cation is in fourfold coordinated state, or reacting potassium silicate with said alumino-silicate oxide and then reacting the resulting mixture with potassium hydroxide, said mineral polymer having an x-ray diffraction pattern, determined by the Debye-Scherrer method using the K-alpha doublet of copper, substantially as follows:

d(A) I
10-11.5 halo
4.49 m
4.27 w
3.52 m
3.33 S
3.23 halo to
2.79 pl 2.56 w
2.25 vw
2.17 vw.

4. The method according to claim 3 further comprising adding at least one filler to the reactant mixture, and heating said reactant mixture until said mixture hardens.

5. A method for preparing a molded object which comprises preparing a potassium silico-aluminate/water mixture comprising potassium silicate, potassium hydroxide and alumino-silicate oxide having the formula:

$(Si_2O_5, Al_2O_2)_n$ without reacting said potassium hydroxide directly with said alumino-silicate oxide, where the molar ratios of the reactants, expressed in terms of oxides, have values in the following ranges:

| | |
|---|---|
| $K_2O/SiO_2$ | 0.30 to 0.38 |
| $SiO_2/Al_2O_3$ | 4.0 to 4.2 |
| $H_2O/Al_2O_3$ | 14 to 20 |
| $K_2O/Al_2O_3$ | 1.3 to 1.52 | combining said silico-aluminate/water mixture with at least one filler; placing said silico-aluminate/filler mixture in a mold; said hardening said silico-aluminate/filler mixture in said mold at a temperature of up to about 120° C. to form a solid, molded articles that includes a mineral polymer having a composition, expressed in terms of oxides as follows:

$yK_2O:Al_2O_3:xSiO_2$ where "x" is a value in the range of about 4.0 to about 4.2 and "y" is a value in the range of about 1.3 to about 1.52, said mineral polymer comprising a potassium polysilicate phase, and a potassium polysialate polymer phase having the formula:

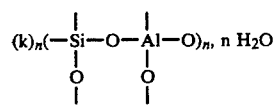

where "n" is the degree of polymerization of said potassium polysialate polymer, said mineral polymer having an x-ray diffraction pattern, determined by the Debye-Scherrer method using the K-alpha doublet of copper, substantially as follows:

d(A) I
10-11.5 halo
4.49 m
4.27 w
3.52 m
3.33 S
3.23 halo to
2.79
2.56 w
2.25 vw
2.17 vw.

6. The method of claim 3 wherein said mineral polymer comprises 35 to 90 parts by weight of said potassium silicate and 10 to 65 parts by weight of said potassium polysialate polymer.

* * * * *

UNITED STATES PATENT AND TRADEMARK OFFICE
CERTIFICATE OF CORRECTION

PATENT NO. : 4,472,199

DATED : September 18, 1984

INVENTOR(S) : JOSEPH DAVIDOVITS

It is certified that error appears in the above-identified patent and that said Letters Patent is hereby corrected as shown below:

Column 9, line 66, that portion of the formula reading $xH_2O$ should read $wH_2O$ Column 10, lines 39-40, that portion of the table reading 3.23 halo to 2.79 should read 3.23 to halo 2.79

Column 11, lines 36-37, that portion of the table reading 3.23 halo to 2.79 pl 2.56 w should read 3.23 to 2.79 2.56 w

UNITED STATES PATENT AND TRADEMARK OFFICE
CERTIFICATE OF CORRECTION

PATENT NO. : 4,472,199

DATED : September 18, 1984

INVENTOR(S) : Joseph Davidovits

It is certified that error appears in the above-identified patent and that said Letters Patent is hereby corrected as shown below:

Column 12, line 11, "said hardening" should read
-- and hardening --; lines 43-44, that portion of the
table reading 3.23 halo to
        2.79        should read 3.23
                            to   halo
                        2.79

Signed and Sealed this

*Twenty-first* Day of *May 1985*

[SEAL]

*Attest:*

DONALD J. QUIGG

*Attesting Officer*     *Acting Commissioner of Patents and Trademarks*

UNITED STATES PATENT AND TRADEMARK OFFICE
CERTIFICATE OF CORRECTION

PATENT NO. : 4,472,199
DATED : September 18, 1984
INVENTOR(S) : Joseph Davidovits It is certified that error appears in the above-identified patent and that said Letters Patent is hereby corrected as shown below:

Column 12, line 27, that portion of the formula reading (k)n should read (K)n.

Signed and Sealed this

Twenty-second Day of October 1985

[SEAL]

Attest:

DONALD J. QUIGG

Attesting Officer

Commissioner of Patents and Trademarks—Designate